INVENTOR.
ANGELO BOUDOURIS
BY Owen & Owen
ATTORNEYS

INVENTOR.
ANGELO BOUDOURIS
BY
Owen & Owen
ATTORNEYS 3,156,774

COMMUNICATION SYSTEM FOR DRIVE-IN RESTAURANTS AND OTHER APPLICATIONS

Angelo Boudouris, 5856 Highland View Drive, Sylvania, Ohio

Filed Sept. 14, 1959, Ser. No. 839,626
17 Claims. (Cl. 179—16)

This invention relates to an electronic system for seeking a remote ground. The invention is described below in a drive-in communication system although other applications will be apparent to those skilled in the art.

With the recent increasing popularity of drive-in restaurants, a number of systems have been devised for taking orders and for conveying food to customers' cars. The communication system of the present application of the invention is specifically designed for ordering systems for drive-ins and includes a number of advantages and improvements over those systems previously devised. In particular, the new system requires fewer components to handle the same number of customers. For example, the new system requires only eight relays to accommodate up to 100 customer stations whereas previously known systems have required many times this number of relays to handle the same number of stations. This simplification results in lower maintenance cost and more trouble-free operation. The fewer number of parts also means that the system consumes less space, and, in actuality, the heart of the system can be maintained in a single, thin wall-mounted cabinet. In addition, the communication controls for a central, order-taking operator are simple so that the operator requires substantially no training. The new system also creates higher profits for the drive-in owner because more customers are attracted due to the novelty of the system, while costs are raised only slightly.

It is a principal object of the invention to provide an improved electronic system for connecting a central station to any of a plurality of remote stations.

Another object of the invention is to provide an improved communication and program system for drive-ins or the like capable of handling more customer stations with fewer components.

A further object of the invention is to provide an ordering system for a drive-in restaurant capable of handling more customer stations with only a few relays, and other stationary components.

Still another object of the invention is to provide an improved ordering system for a drive-in restaurant, which system is more compact and requires less maintenance.

Figures 1, 2:
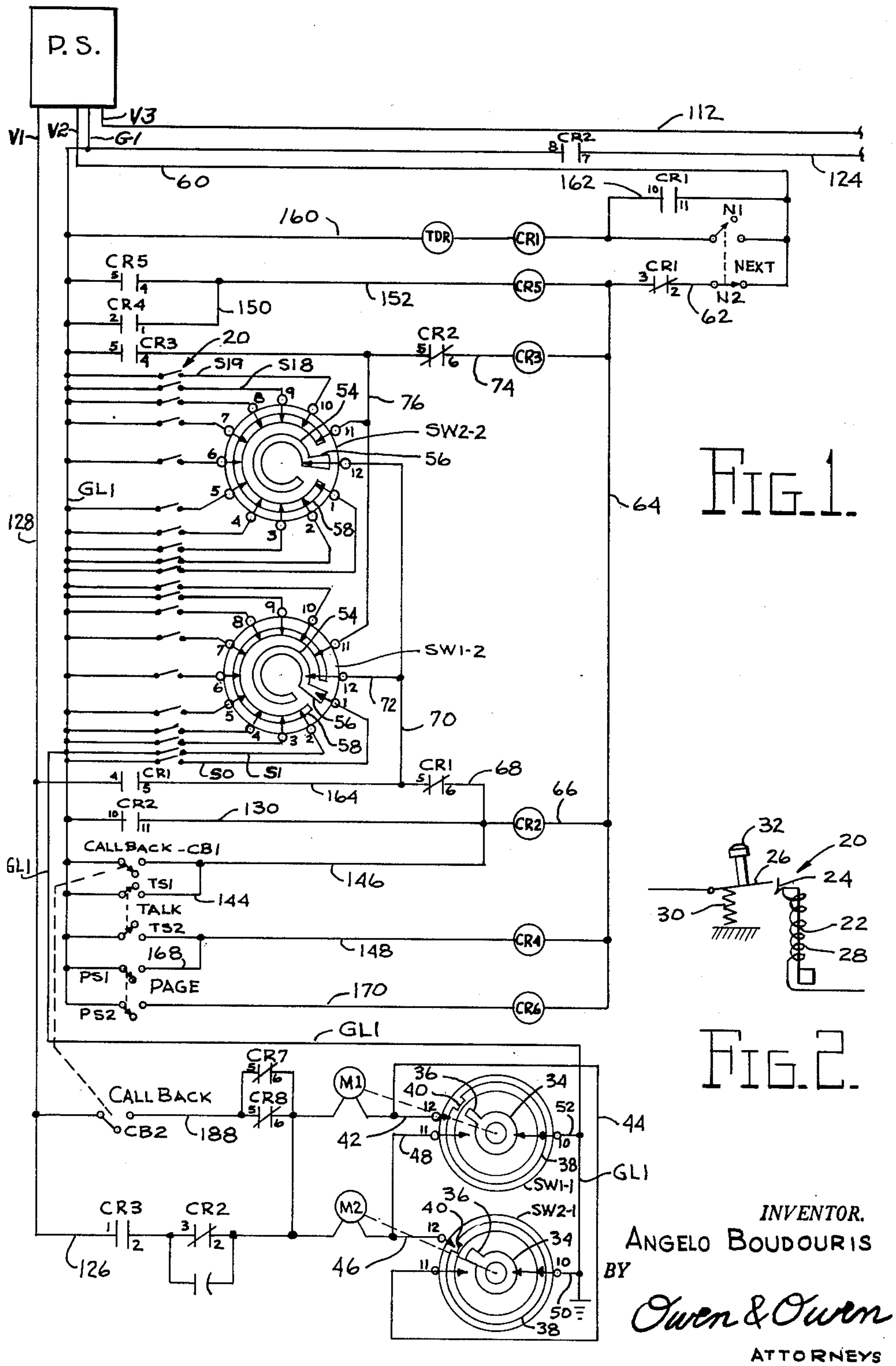
Figure 1A:
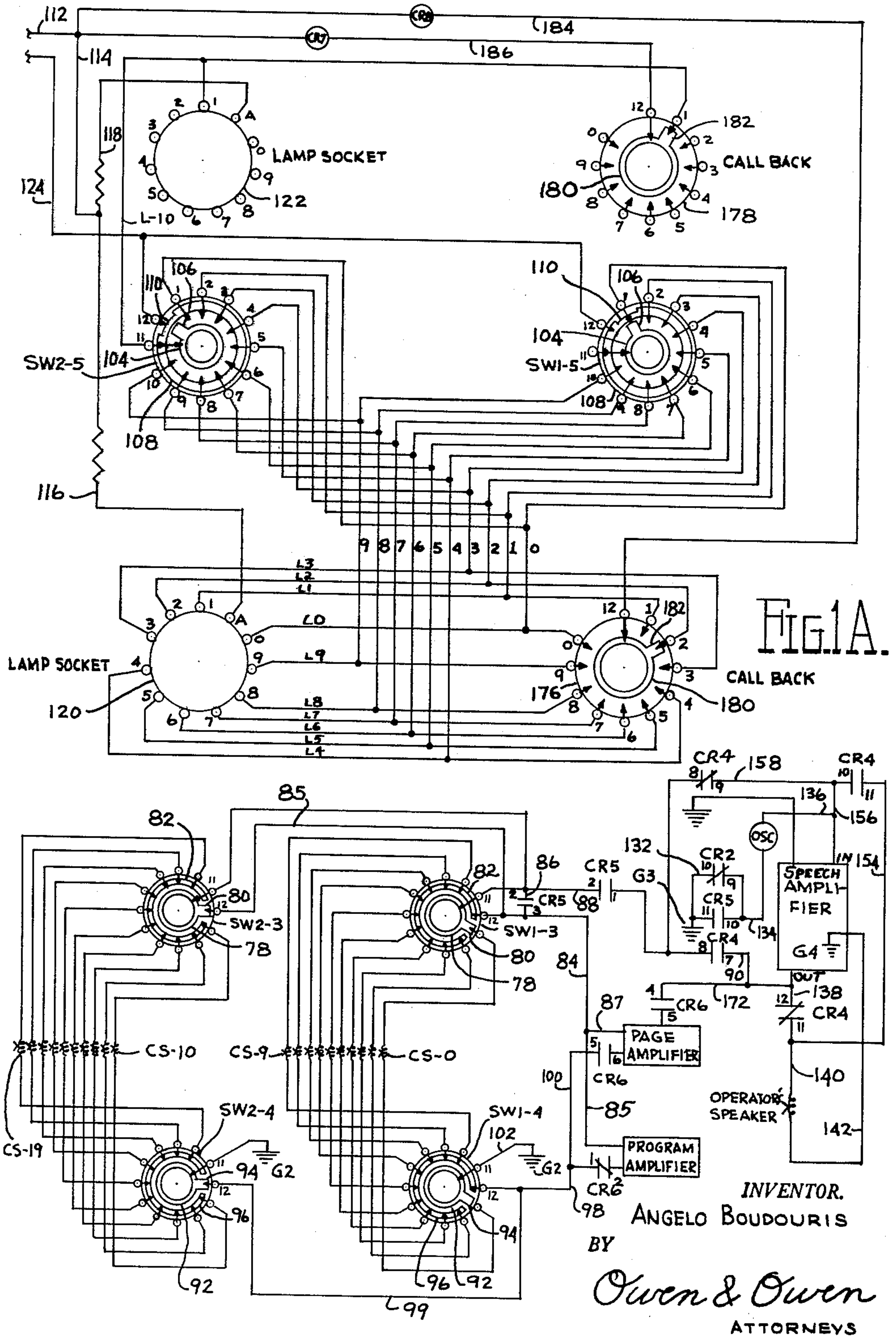

Other objects and advantages of the invention will be suggested from the following detailed description of a preferred embodiment thereof, reference being made to the accompanying drawing, in which:

FIGS. 1 and 1A are diagrammatic views of a circuit embodying one application of the invention; and FIG. 2 is a schematic view of a thermal release switch employed in the circuit shown in FIGS. 1 and 1A.

Before delving into the details of the circuit, its overall operation will first be set forth. A customer drives into a drive-in parking area to any one of a number of stations. At this time, music is being played through all customers' electro-acoustic transducers or two-way speakers not in use, there being one speaker at each station. When the customer is ready to order, he presses a button of a thermal release switch on the speaker and when the music stops, the customer knows he is connected with the central unit. If another customer is talking with the central unit at the time the button is pushed, the music continues to play until the system cycles to clear the line, at which time the music stops. The operator at a central building, who knows at which station a customer is calling in, because the station number is designated by a direct digital read-out device, such as neon indicator lamps, then pushes a talk button and through an operator's electro-acoustic transducer or two-way speaker asks the customer for his order. After the operator releases the talk button, the customer gives his order through his speaker, which order is received by the operator's speaker. Upon completion of taking that customer's order, a "Next" button is pushed by the operator and the system will automatically switch to another station calling in. The operation is then repeated. If the operator wishes to call back to a station with which communication previously has been made, he sets the desired station number on call-back dials and presses a call-back switch which then enables him to talk to that station.

For paging, a page switch is pressed which connects the operator's speaker to those of all customer stations and enables the operator to talk to all stations simultaneously.

While the circuit according to the invention, as shown in FIGS. 1 and 1A, can be used to handle up to 100 customer stations, only 20 stations are shown for clarity of illustration. Each station includes the speaker and the thermal release switch, the latter being shown schematically at the left hand side of FIG. 1 and shown in detail in FIG. 2. The thermal release switch, indicated by the numeral 20, includes a bi-metallic strip 22 which has an offset portion 24 hooking over the outer end of a switch lever 26 when the strip 22 is unheated, and the lever 26 is depressed. When it is desired to open the switch, a heavy current is supplied through a coil 28 wrapped around the strip 22 to heat it and cause it to bend outwardly, thus releasing the lever 26 which is then urged upwardly by a spring 30. The switch 20 can be located in a speaker casing at each customer station and has a button 32 protruding from the casing which is pushed inwardly to close the switch 20. Each of the station speakers, schematically indicated at the lower left hand side of FIG. 1A, can also serve as a microphone for the customer.

In addition to the speakers and the thermal release switches at the customer stations, the system includes a central operator's unit located in the main building of the drive-in, which unit can be set on any small table, occupying less than one square foot of space. This unit includes talk, page, and call-back switches, indicated at the lower left hand side of FIG. 1, the station indicator read-out devices or neon lamps and call-back dials, FIG. 1A, and the operator's speaker, which also serves as a microphone, shown at the lower right hand corner of FIG. 1A. A thin, wall-mounted cabinet located in the drive-in restaurant includes transformers, amplifiers, relays, automatic switches, and suitable drivers for operating same. The drivers can be any of several suitable devices such as motors, rotary solenoids, or other rotary driving units.

In the following description, the prefix "NC" before the word "contacts" designates relay contacts which are normally closed when their relay is unactuated and "NO" designates relay contacts which are normally opened when their relay is unactuated.

A basic part of an electronic ordering system according to the invention constitutes a series of driven rotary switches for a series of customer stations. As shown in the circuit, two series of five switch wafers can handle twenty stations. It is to be understood, however, that many more stations can be employed by adding an additional series of switch wafers and a driver for each group of stations. The five series of switch wafers for the first ten stations are designated SW1–1, SW1–2, SW1–3, SW1–4, and SW1–5 and the five series of switch wafers for the second group of stations are designated as SW2–1, SW2–2, SW2–3, SW2–4, and SW2–5. Each series is connected mechanically to a driver or motor M1 or M2 and rotates in unison. The first driver switch wafers SW1-1 and SW2-1 (FIG. 1) of the two series are used to control operation of the two drivers M1 and M2. The second station switch wafers SW1-2 and SW2-2 are used to seek out a station at which a customer has pressed the thermal release button 32. The third and fourth, speaker switch wafers in the two series, designated SW1-3, SW1-4, SW2-3, and SW2-4 (FIG. 1A) connect the proper station speaker into the circuit. Finally, the fifth, read-out device or lamp switch wafers SW1-5 and SW2-5 in the two series control the station number indicated on the read-out device in the central unit and also control the call back operation if the central operator wishes to re-communicate with a given station.

Referring in more detail to the first, driver switch wafers SW1-1 and SW2-1, each includes an inner ring 34 having a tang 36 and an outer ring 38 having a notch 40, both of which rings rotate together with the notch 40 in a position on the ring 38 corresponding to the position of the tang 36 on the inner ring 34. The first driver M1 has a first line 42 connected to a lug 12 of the switch wafer SW1-1 and a second line 44 connected to a lug 11 of the switch wafer SW2-1. Similarly, the second driver M2 has a first line 46 connected to a lug 12 of the switch wafer SW2-1 and a second line 48 connected to a lug 11 of the switch wafer SW1-1. The lines 42-48 are connected to ground line designated GL1 through lugs 10 on the two switch wafers and through lines 50 and 52, with the lugs 10 connected electrically to both the inner rings 34 and the outer rings 38. In the position shown in the drawing, the driver M2 is stopped because there is no ground completed through the line 46, being out of contact with the outer ring 38 of the switch wafer SW2-1 because of the notch 40, and being out of contact with the tang 36 of the inner ring 34 of the wafer SW1-1. However, ground is completed for the driver M1 through the line 42 and the outer ring 38 of the switch wafer SW1-1. The driver M1 makes one complete revolution until the notch 40 of the first switch wafer SW1-1 is agin in register with the lug 12 and the line 42, at whic htime the driver M1 stops. Just before reaching this position, however, the lug 11 of the switch wafer SW1-1 is momentarily in contact with its tang 36, thus completing a ground for the driver M2 and running it long enough for the notch 40 of the second switch wafer SW2-1 to move past its lugs 12, thus enabling a ground to be completed through the line 46 and the outer ring 38 and enabling the second driver M2 to make one complete revolution near the end of which the tang 36 of the second switch wafer SW2-1 momentarily contacts its lug 11 and completes a ground through the line 44 momentarily to enable the notch 40 of the wafer SW1-1 to move away from its lug 12 and again enable the driver M1 to complete one revolution. Thus, the two switch wafers sequentially operate in a predetermined sequence, each for one revolution. If more drivers and switches are employed, they would continue to operate in a predetermined sequence, each for one revolution, until current is disconnected from the hot sides of the drivers.

The second, station switch wafers SW1-2 and SW2-2 in the two series each have an inner ring 54 with a tang 56 and an outer, arcuate ring 58, the tang 56 extending into a space between the ends of the latter. Both the inner ring 54 and the outer ring 58 rotate together. A voltage V2 of a power source designated PS is connected to lugs 12 of the station switch wafers SW1-2 and SW2-2 through a first power path comprising lines 60, 62, 64, 66, 68, 70 and 72, and lugs 1-10 of each of these switches are connected to the ground line G1 through the thermal release switches 20 in lines S0 to S19. Lugs 11 of the wafers SW1-2 and SW2-2 are connected to the voltage source V2 of the power supply PS through a second power path comprising the lines 60, 62, and 64, and lines 74 and 76. The voltage V2 is thus connected to all of the thermal release switches 20, except one, through the first power path and the outer rings 58. The remaining station S0, as shown, is connected to the voltage V2 through the second power path, the tang 56, and the inner ring 54 of the wafer SW1-2.

The third, speaker switch wafers SW1-3 and SW2-3 (FIG. 1A) of the two series each have an inner ring 78 with a tang 80 and an outer, arcuate ring 82, the tang 80 extending between the ends of the latter, both of these rings rotating together. Lugs 11 of these wafers connect a source of music from a program amplifier through lines 84 and 85, and through the outer rings 82 to all customer speakers designated CS0 to CS19 except for the speaker CS0, as shown, which is connected through the tang 80 and the inner ring 78 to a lug 11 of the wafer SW1-3, and hence either to the music output of the program amplifier through a line 86 and the line 84, or to the output of a speech amplifier through lines 88 and 90.

The fourth, speaker switch wafers SW1-4 and SW2-4 of the two series have inner rings 92 with tangs 94 and outer, arcuate rings 96 having voids into which the tangs 94 extend. Lugs 12 of the wafers connect all of the speakers CS0-CS19 except the speaker CS0 in this instance through lines 98 and 99 to the program amplifier or through a line 100 to the page amplifier. Lugs 11 of the wafers connect one of the speakers CS0 to CS19, the speaker CS0 in this instance, to a ground G2 through the tang 94, the inner ring 92, and a line 102.

The fifth, read-out device switch wafers SW1-5 and SW2-5 control current to neon lamp sockets, or other direct read-out device, and for this purpose each includes an inner ring 104 with a tang 106 and an outer ring 108 with a notch 110. A voltage V3 of the power supply is connected through lines 112 (FIGS. 1 and 1A), 114, 116, and 118 to lugs A of lamp sockets 120 and 122. The socket 120 connects electrically into the circuit a commercially available neon indicator lamp or other digital read-out device (not shown) which contains suitable filaments in the configuration of numbers 0-9 to indicate the units digit of any customer station calling in, when the corresponding filament is grounded. The lamp socket 122 connects electrically into the circuit another of the neon lamps or other read-out device (not shown) also having filaments in the configurations of numbers 0-9 to indicate the tens digit of any customer station calling in, when the corresponding filament is grounded. The filaments of the units lamp are connected to ground through terminals 1-0 of the socket 120, lines L-1 to L-0, the tang 106, the inner ring 104, the lug 11, the outer ring 108, the lug 12, and a line 124. Only the filament 1 of the tens digit lamp for the socket 122 can be connected to ground, in this instance, through the terminal 1, a line L-10, the lug 11, the outer ring 108, and the lug 12 of the switch wafer SW2-5, and the line 124. When either of the drivers M1 or M2 is in its normal stopped position, the driver M2 in this instance, the notch 110 of the corresponding switch wafer SW1-5 or SW2-5, the latter in this instance, is aligned but out of contact with the lug 12 so that neither of the lamps can be lighted through the wafer SW1-5 or SW2-5 when its corresponding driver M1 or M2 is stopped at lug 12, the normal run-out position.

*Dormant State*

In the dormant state, with none of the customer stations in use, all of the stations except the last one with which communication was made, will be connected to the voltage V2 through the lugs 11 of the switch wafers SW1-2 and SW2-2, and through the lines 60-64, 74, and 76. The other station is connected to the voltage V2 through lines 60-72. However, no current is flowing through any of these lines because the customer switches S0-S19 are opened and disconnected from the ground line GL1 and the ground G1.

*Operation*

Suppose a customer now drives into station 0 and desires to place an order. He presses the button 32 of the thermal release switch 20 to close this switch and thereby establishes a circuit from the voltage V2 at the power source PS through the lug 11 of the switch SW1–2 and, hence, through the outer ring 58 and the line S0 to the ground G1. Current through the path thus established actuates a start relay CR3 int the line 74 which starts the driver M1 or M2 by closing NO contacts 1 and 2 of the relay CR3 in a line 126, to establish a path from a source of voltage V1 at the power supply PS through a line 128 and the line 126 to the drivers M1 and M2 which then operate the driver switch wafers SW1–1 and SW2–1 in a predetermined sequence, as discussed previously. The start relay CR3 is also locked in at this time by closing its NO contacts 4 and 5 in the line 74. The drivers continue to operate in sequence until the tang 56 of the switch wafer SW1–2 contacts the lug 1 for the station 0 and completes a circuit through lines 60–72, the inner ring 54 and the line S–0, as shown. This actuates a stop relay CR2 in the line 66 which stops the drivers M1 and M2 from further operation by opening its NC contacts 2 and 3 in the line 126. The relay CR2 also blocks additional calls from other stations and prevents further actuation of the start relay CR3 even if additional buttons 32 of the switches 20 at other stations should be depressed by opening NC contacts 5 and 6 of the stop relay CR2 in the line 74. The stop relay CR2 is locked in at this time by closing its NO contacts 10 and 11 in a line 130. The stop relay CR2 also connects the lugs 12 of the switch wafers SW1–5 and SW2–5 (FIG. 1A) to ground by closing its NO 7 and 8 in the line 124 to complete a circuit through the terminal 0 and the terminal A of the lamp socket 120 to light the filament 0 of the neon lamp in order to indicate the number of the station calling in.

An oscillator designated Osc. (FIG. 1A) is simultaneously activated by disconnecting its operating voltage from a ground G3 by the opening of NC contacts 9 and 10 of the stop relay CR2 in a line 132 connected to the oscillator by a line 134. The oscillator is connected to the input of the speech amplifier through a line 136, and produces an annoying squeal in the central operator's speaker located in the central building of the drive-in restaurant. The squeal is transmitted to the speaker through lines 138 and 140, and, hence, to a ground G4 through a line 142. This squeal is audible in the main building and immediately lets an operator know that someone is calling in. The operator is quick to answer the call because of the annoying characteristic of the squeal. Of course, other signals can be employed, if desired.

It may be noted that the station switch wafers SW1–2 and SW2–2 pick up stations in a given sequence as they rotate in a predetermined direction. If it is desired to take orders from stations at various areas of the drive-in, rather than sequentially, the stations can be connected to the wafers SW1–2 and SW2–2 in a scrambled rather than a numerical sequence. Thus, instead of the stations being connected 0–9 in order, they may be connected 0–5–1–6–2–7–3–8–4–9, for example.

*Talk*

When the operator is ready to take the order, he closes the talk switch having two poles designated TS1 and TS2 in FIG. 1. The poles TS1 close a line 144 to assure that the stop relay CR2 will be pulled in, if not already locked in, by completing a circuit through this relay through the line 66 and a line 146. The poles TS2 of the talk switch close a line 148 to complete a circuit through a talk relay CR4. The talk relay then closes its NO contacts 1 and 2 in a line 150 to complete a circuit through a transfer relay CR5 in a line 152, which relay then locks in by closing its NO contacts 4 and 5 in the line 152. Actuation of the relays CR4 and CR5 disconnects the squeal from the central speakers by again connecting the oscillator output to ground by closing NO contacts 10 and 11 (FIG. 1A) of the transfer relay CR5 in the line 132. The central speaker is then operated as a microphone by being connected to the input of the speech amplifier, rather than the output. This is accomplished by closing NO contacts 10 and 11 of the talk relay CR4 in a line 154 and by opening its NC contacts 11 and 12 in the line 138 which connect the remote speaker through the line 140, the line 154, and a line 156 to the input of the speech amplifier and disconnect it from the output through the line 138. In addition, the talk relay CR4 opens its NC contacts 8 and 9 in a line 158 to disconnect the input of the speech amplifier from the customer speakers, and closes NO contacts 7 and 8 in the line 90 to connect the output of the speech amplifier to the customer speaker CS0 through the lines 88 and 90, the inner ring 78 and the tang 80. The lug 11 of the wafer SW1–3 thereby is connected to the speaker CS0 at the station 0. At the same time, the transfer relay CR5 opens its NC contacts 2 and 3 in the line 86 to disconnect the lug 11 from the music output of the program amplifier. However, music continues to be supplied through the other customer speakers through the lines 84 and 85 and the lugs 12 of the third switch wafers SW1–3 and SW2–3. A circuit is completed through these speakers back to the program amplifier through the outer rings 96, the lugs 12 of the fourth switch wafers SW1–4 and SW2–4, and the lines 98 and 99.

A circuit is completed through the speaker CS0 to the ground G2 through the tang 94, the inner ring 92, and the lug 12 of the fourth wafer SW1–4. Thus, the speaker at the central unit now acts as a microphone and the customer speaker acts as a speaker in the usual manner. Music has been disconnected from the customer speaker CS0 and the central operator can now ask for the order.

When the talk switch is released and opened, the transfer relay CR5 remains actuated but the talk relay CR4 is inactuated and the NC contacts 8 and 9 in the line 158 again close and the NO contacts 7 and 8 in the line 90 also open again so that the customer speaker CS0 will serve as a microphone, being connected to the speech input. The speaker at the central unit is connected again to the output of the speech amplifier through the lines 138 and 140 when the NC contacts 11 and 12 of the talk relay CR4 are closed and is disconnected from the speech amplifier input when the NO contacts 10 and 11 in the line 154 open.

*Completion of Call*

When the order taking of a station, in this case station 0, has been completed, a switch designated "Next" (FIG. 1), having two poles N1 and N2, is closed. The poles N1 complete a circuit through a line 160 to actuate a hold relay CR1 which is held in by closing its NO contacts 10 and 11 in a by-pass line 162 until a time delay relay TDR in the line 160 drops out after 2 or 3 seconds. While the hold relay CR1 is actuated, it connects an overload voltage V1 through the line 128 and a line 164 to the lugs 12 of the station switch wafers SW1–2 and SW2–2 by closing its NO contacts 4 and 5 in the line 164. NC contacts 5 and 6 of the relay CR1 also open the line 68 at this time to disconnect the voltage V2 from the wafer SW1–2. Relatively heavy current passes through the inner ring 54 and the tang 56 of the wafer SW1–2 to the coil 28 of the switch 20 in the line 0, causing it to heat the bi-metallic strip 22 and open the switch after a short interval, thus opening the ground path previously established.

When the "Next" switch is pressed, the poles N2 open to disconnect the voltage V2 from all of the relays, thus causing them to drop out. NC contacts 2 and 3 of the hold relay CR1 in the line 62 open and remain open while the time delay relay switch TDR is operating to prevent any premature operation of relays until the switch 20 in the line S1 has opened fully.

If no other switch 20 has been closed during communication with the station 0, the system will remain dormant after the time delay relay TDR has opened and disconnected the hold relay CR1. However, if another of the switches 20 has been closed, such as the switch 20 at the station 12, the start relay CR3 will again be actuated to commence a new cycle with operation continuing as before except in this instance, because the fifth switch wafer will not stop at position 12, the lug 11 of the fifth switch wafer SW2–5 will complete a circuit through the terminals A and 1 of the lamp socket 122 to light the tens digit #1 through the filament #1 in the tens digit neon lamp. Similarly to the prior operation, a circuit will also be completed through the terminals A and 2 of the lamp socket 120 to light the units digit #2 through the filament #2 of the units digit neon lamp.

*Paging*

When the operator at the central unit desires to communicate with all of the stations, a double-pole paging switch (FIG. 1) is pressed to close first poles PS1 in a by-pass line 168 for the talk relay CR4 and to close second poles PS2 in a line 170 which completes a circuit through a page relay CR6. The page relay connects the output of the speech amplifier (FIG. 1A) to the input of a page amplifier by closing NO contacts 4 and 5 in a line 172. The output of the page amplifier is connected to the music output line 84 through the line 87, and, hence, to all of the speakers except the last one talked to through the lugs 12 and the outer rings 82 of the third switch wafers SW1–3 and SW2–3. The page relay CR6 connects the other side of the speakers to the page amplifier by closing NO contacts 5 and 6 in the line 100. At the same time, NC contacts 1 and 2 of the relay CR6 in the line 98 are opened to disconnect the music from these speakers. When the poles PS1 (FIG. 1) in the line 168 are closed, they energize the talk relay CR4 to make connection with the last speaker with which communication was made through the speech amplifier, the lines 90 and 88, the inner ring 78, the tang 80, and the appropriate speaker line, in the same manner as before. Hence, all station speakers are now connected to the central speaker for paging purposes.

*Callback*

If the operator desires to call back the last station with which communication was made, this can be accomplished simply by closing the talk switch. However, if another station is to be called, the station 12, for example, its number is set on dials of two call back selector switches 176 and 178, as shown in FIG. 1A, the former being for units an dthe latter for tens. With rings 180 and tangs 182 of the switches set at the appropriate numbers, a path is established from the power source through lines 184 and 186, through lugs 12, the tangs 182 and the rings 180, and through the neon lamp lines to the wafers SW1–5 and SW2–5 which are not connected to ground. A double pole call-back switch (FIG. 1) having poles CB1 and CB2 in the line 146 and a line 188 is then closed. The poles CB1 close the line 146 to actuate the stop relay CR2 which opens its NC contacts 5 and 6 in the line 74 to block any incoming calls. The NO contacts 7 and 8 in the line 124 of the stop relay CR2 also close to complete a path through the call back dials and the fifth switch wafers.

Closing the poles CB2 operates the driver M1 or M2 and rotates the switch wafer SW1–5 or SW2–5 until the tang 106 of the inner ring 104 of the fifth switch wafer SW2–5 makes ground contact with the station 12 set on the call back selectors 176 and 178. A path is then established through the line 184, through the call back selector 176, through the lug 2, the inner ring 104, the lug 11, the outer ring 108, and the lug 12 of the fifth switch wafer SW2–5, and to ground through the line 124. This pulls in a call-back relay CR8 which opens NC contacts 5 and 6 in the line 188. A path is also established through the line 186, through the call-back selector 178, through the lug 11, the outer ring 108, and the lug 12 of the fifth switch wafer SW2–5, and to ground through the line 124. This pulls in a call-back relay CR7 in the line 186 which open its NC contacts 5 and 6 in the line 188. With both sets of contacts in the line 188 open, the driver M2 is stopped. The neon lamps also light at this time to indicate that the desired station is connected. The desired station is thus connected and communications can be made therewith by closing the talk switch in the usual manner.

It is to be understood that the scanning and communication system according to the invention need not be limited to a drive-in communication system but has many other applications.

As used in the appended claims, the term "speaker" is used in a sense to include an electro-acoustic transducer which will operate to change a modulated electrical current to sound energy, as well as to change an impinging sound wave train into a modulated electrical signal.

Various modifications of the above specific embodiment of the invention will be apparent to those skilled in the art. Such modifications can be made without departing from the invention, if within the scope and spirit of the appended claims.

I claim:

1. A scanning system for connecting a central station to at least one of a plurality of remote stations, said system comprising means associated with each of the remote stations for making a circuit connection, switch means, a source of power, a first power path, a second power path, means associated with said switch means to connect one of said power paths simultaneously to all stations except one, means associated with said switch means to connect the other of said power paths to the remaining station, means associated with said switch means for changing the remaining station to which said other path is connected, means effective to operate said changing means when any of the circuit-connecting means except the circuit-connecting means of said remaining station is actuated to establish a circuit connection, and means effective to stop operation of said changing means when said other path of current is connected through the circuit-connecting means of the remaining station to complete a circuit for said other path.

2. A system for connecting a central station to at least one of a plurality of remote stations, said system comprising means associated with each of the remote stations for making a circuit connection, two power paths connected to at least one source of power, means for connecting one of said power paths simultaneously to all stations except one, means for connecting the other of said power paths to the remaining station, means for changing the remaining station to which said other power path is connected, means effective to operate said changing means when any of the circuit-connecting means except the circuit-connecting means of said remaining station makes a circuit connection, and means effective to stop operation of said changing means when said other power path is connected through the circuit-connecting means of the remaining station to complete a circuit for said other power path during operation of said changing means.

3. A system for connecting a central station to at least one of a plurality of remote stations, said system comprising means associated with each of the remote stations for making connection to ground, two power paths connected to at least one source of power, means for connecting one of said power paths simultaneously to all stations except one, means for connecting the other of said power paths to the remaining station, means for changing the remaining station to which said other power path is connected, means associated with said one power path effective to operate said changing means when said one path is connected to ground through one of said remote stations, and means associated with said other path effective to stop said changing means when said other path is connected to ground through said one remote station during operation of said changing means.

4. A system according to claim 3 in which said means for making connection to ground is a thermal release switch comprising a switch lever, a bi-metallic strip, means associated with said strip for engaging said lever when said strip is unheated, and means for heating said strip to move said engaging means away from said lever.

5. A communication system for connecting a speaker at a central station to at least one of a plurality of remote speakers at remote stations, said system comprising means associated with each of the remote stations for making a circuit connection, two power paths connected to at least one source of current, means for connecting one of said power paths simultaneously to all of the stations except one, means for connecting the other of said power paths to the remaining station, means for changing the remaining station to which said other path is connected, means effective to operate said changing means when any of the circuit-connecting means of said stations except the circuit-connecting means of the remaining station is actuated to establish a circuit connection, means effective to stop operation of said changing means when said other power path is connected through the ground-connecting means of the remaining station to complete a circuit for said other power path, and means associated with said other path to establish a signal at said central speaker when a circuit is completed for said other power path through the circuit-connecting means of the remaining station.

6. A communication system for connecting a speaker at a central station to at least one of a plurality of remote speakers at remote stations, said system comprising means associated with each of the remote stations for making a circuit connection, two power paths connected to at least one source of current, means for connecting one of said power paths simultaneously to all of the stations except one, means for connecting the other of said power paths to the remaining station, means for changing the remaining station to which said other path is connected, means effective to operate said changing means when any of the circuit-connecting means of said stations except the circuit-connecting means of the remaining station is actuated to establish a circuit connection, means effective to stop operation of said changing means when said other power path is connected through the circuit-connecting means of the remaining station to complete a circuit for said other power path, a manually operated switch, and means operated by said manual switch for connecting said central speaker for communication with the remote speaker of the remaining station through which a circuit has been completed.

7. A communication system for connecting a speaker at a central station to at least one of a plurality of remote speakers at remote stations, said system comprising means associated with each of the remote stations for making a circuit connection, two power paths connected to at least one source of current, means for connecting one of said power paths simultaneously to all of the stations except one, means for connecting the other of said power paths to the remaining station, means for changing the remaining station to which said other path is connected, means effective to operate said changing means when any of the circuit-connecting means of said stations except the circuit-connecting means of the remaining station is actuated to establish a circuit connection, means effective to stop operation of said changing means when said other power path is connected through the circuit-connecting means of the remaining station to complete a circuit for said other power path, an amplifier having an input and an output, a manually operated switch, means operated by said switch for connecting said central speaker to the input of said amplifier, and means associated with said changing means and with said switch for connecting the output of said amplifier to the remote speaker at the remaining station through which a circuit has been completed.

8. A communication system for connecting a speaker at a central station to at least one of a plurality of remote speakers at remote stations, said system comprising means associated with each of the remote stations for making a ground connection, two power paths connected to at least one source of current, means for connecting one of said power paths simultaneously to all of the stations except one, means for connecting the other of said power paths to the remaining station, means for changing the remaining station to which said other path is connected, means effective to operate said changing means when any of the circuit-connecting means of said stations except the circuit-connecting means of the remaining station is actuated to establish a circuit connection, means effective to stop operation of said changing means when said other power path is connected through the circuit-connecting means of the remaining station to complete a circuit for said other power path, a speech amplifier having an input and an output, means associated with said changing means for connecting the remote speaker at the remaining station through which a circuit has been completed to the input of said amplifier, a manually operated switch, means operated by a said switch for connecting said central speaker to the input of said amplifier when said switch is closed, and connecting means associated with said changing means and with said switch for connecting the output of said amplifier to the remote speaker at the remaining station through which the circuit has been completed.

9. A communication system according to claim 8 and paging means including a page amplifier, means for connecting said page amplifier to the output of said speech amplifier, and means associated with said connecting means for connecting the output of said paging amplifier to all of the remote speakers except that remote speaker at the remaining station.

10. A communication system for connecting a speaker at a central station to at least one of a plurality of remote speakers at remote stations, said system comprising means associated with each of the remote stations for making connection to ground, two power paths connected to at least one source of current, means for connecting one of said power paths simultaneously to all of the stations except one, means for connecting the other of said power paths to the remaining station, means for changing the remaining station to which said other path is connected, means effective to operate said changing means when any of the ground connecting means of said stations except the ground connecting means of the remaining station is actuated to establish a ground connection, means effective to stop operation of said changing means when said other power path is connected to ground through the ground-connecting means of the remaining station, a manually operated switch, a second source of power, and means operated by said manually-operated switch for connecting said second source of power through said changing means to the ground-connecting means for said remaining station to disconnect said ground-connecting means from ground.

11. A communication system for connecting a speaker at a central station to at least one of a plurality of remote speakers at remote stations, said system comprising means associated with each of the remote stations for making connection to ground, two power paths connected to at least one source of current, means for connecting one of said power paths simultaneously to all of the stations except one, means for connecting the other of said power paths to the remaining station, means for changing the remaining station to which said other path is connected, means effective to operate said changing means when any of the ground-connecting means of said stations except the ground-connecting means of the remaining station is actuated to establish a ground connection, means effective to stop operation of said changing means when said other power path is connected to ground through the ground-connecting means of the remaining station, selecting means associated with said changing means and operated therewith, digital read-out means indicating the number of the remote station at which the ground-connecting means is connected to ground, and means connecting said read-out means to said selecting means for indicating the proper station.

12. An electronic system comprising a plurality of means for making connection to ground, two power paths connected to at least one source of current, means for connecting one of said power paths simultaneously to all of the ground-connecting means except one, means for connecting the other of said power paths to the remaining ground-connecting means, means for changing the remaining ground-connecting means to which said other path is connected, means effective to operate said changing means when any of the ground-connecting means except the remaining ground-connecting means is actuated to establish a ground connection, means effective to stop operation of said changing means when said other power path is connected to ground through the remaining ground-connecting means, selecting means associated with said changing means and operated therewith, digital read-out means indicating which ground-connecting means is connected to ground, and means connecting said read-out means to said selecting means for indicating the proper ground-connecting means.

13. A system for connecting a central station to at least one of a plurality of remote stations, said system comprising means at each remote station for making a circuit connection, at least two rotary switch wafers, a plurality of lugs on each of said rotary switch wafers, a driver for rotating each of said rotary switch wafers, a source of current connected to one of the lugs of each of said rotary switch wafers, means for connecting said source of current to each of said circuit-connecting means in sequence when each wafer is rotated, means associated with each of said drivers for operating each driver to drive each of said wafers through one revolution in a predetermined sequence, means for starting one driver when a circuit connection is made through any one of said circuit-connecting means, and means for stopping the operating driver when said wafer is rotated to a position in which said source of current is connected through said circuit-connecting means which has made a circuit connection.

14. A scanning system comprising a plurality of remote means for making circuit connections, switch means, a source of power, a first power path, a second power path, means associated with said switch means to connect one of said power paths simultaneously to all circuit-connecting means except one, means associated with said switch means to connect the other of said power paths to the remaining circuit-connecting means, means associated with said switch means for changing the remaining circuit-connecting means to which said other path is connected, means effective to operate said changing means when any of the circuit-connecting means except the remaining circuit-connecting means is actuated to establish a circuit connection, and means effective to stop operation of said changing means when said other path of current is connected through the remaining circuit-connecting means which has made a circuit connection.

15. A system comprising a plurality of remote means for making connection to ground, two power paths connected to at least one source of power, means for connecting one of said power paths simultaneously to all ground-connecting means except one, means for connecting the other of said power paths to the remaining ground-connecting means, means for changing the remaining ground-connecting means to which said other power path is connected, means effective to operate said changing means when any of the ground-connecting means except the remaining ground-connecting means is connected to ground, and means effective to stop operation of said changing means when said other power path is connected through the remaining ground-connecting means to ground during operation of said changing means.

16. A system comprising a plurality of remote ground-connecting means for making connection to ground, two power paths connected to at least one source of power, means for connecting one of said power paths simultaneously to all ground-connecting means except one, means for connecting the other of said power paths to the remaining ground-connecting means, means for changing the remaining ground-connecting means to which said other power path is connected, means associated with said one power path effective to operate said changing means when said one path is connected to ground through one of said remote ground-connecting means, and means associated with said other path effective to stop said changing means when said other path is connected to ground through said one remote ground-connecting means during operation of said changing means.

17. A system comprising a plurality of remote switches, two power paths connected to at least one source of power, means for connecting one of said power paths simultaneously to all switches except one, means for connecting the other of said power paths to the remaining switch, means for changing the remaining switch to which said other power path is connected, means associated with said one power path effective to operate said changing means when said one path is completed through one of said switches, and means associated with said other path effective to stop said changing means when said other path is completed through said one switch during operation of said changing means.

References Cited in the file of this patent

UNITED STATES PATENTS

| | | |
|---|---|---|
| 2,146,362 | Thompsen | Feb. 7, 1939 |
| 2,662,119 | Buchner | Dec. 8, 1953 |
| 2,896,021 | Philipps | July 21, 1959 |
| 2,917,581 | MacFarlane et al. | Dec. 15, 1959 |
| 2,966,554 | Dubois | Dec. 27, 1960 |